(No Model.)

H. D. KING.
BLACKSMITH'S FURNACE.

No. 353,686.　　　　　　Patented Dec. 7, 1886.

WITNESSES:
John M. Speer.
Gustav Schneppé.

INVENTOR
Hubbard D. King.
BY Briesen & Steele, his
ATTORNEYS

UNITED STATES PATENT OFFICE.

HUBBARD D. KING, OF HACKENSACK, NEW JERSEY.

BLACKSMITH'S FURNACE.

SPECIFICATION forming part of Letters Patent No. 353,686, dated December 7, 1886.

Application filed July 24, 1886. Serial No. 208,921. (No model.)

*To all whom it may concern:*

Be it known that I, HUBBARD D. KING, a resident of Hackensack, in the county of Bergen and State of New Jersey, have invented an Improvement in Blacksmiths' Furnaces, of which the following is a full, clear, and exact description, reference being made to the accompanying drawings, in which—

Figure 1:
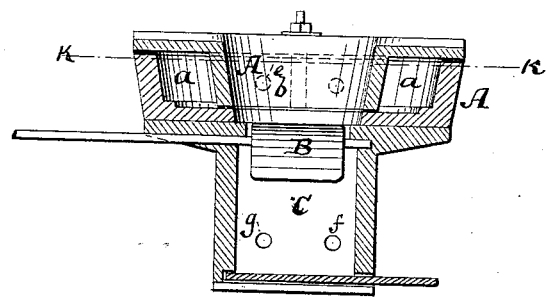
Figure 2:
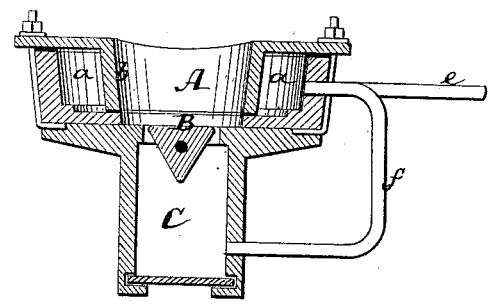
Figure 3:
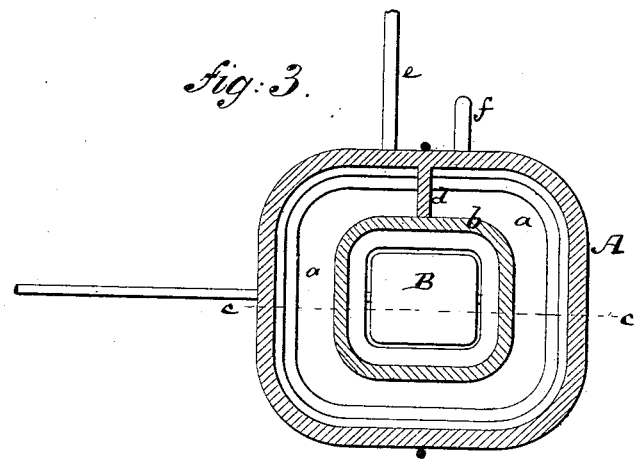

Figure 1 represents a vertical longitudinal section of my improved blacksmith's furnace, taken on the line $c\ c$, Fig. 3. Fig. 2 is a vertical cross-section of the same, taken at right angles to the line $c\ c$. Fig. 3 is a horizontal section on the line $k\ k$, Fig. 1.

This invention relates to a new construction of blacksmith's furnace, having for its object the preheating of the air that is blown by the bellows into the fire and the preservation of the fire-chamber.

The invention consists in surrounding the fire-chamber with an annular air-chamber having a transverse partition, said air-chamber being connected with the bellows, and also with the pit below the fire, as hereinafter more fully described.

In the drawings, the letter A represents the fire-chamber of the furnace. B is the grate or support for the fuel. C is the pit or chamber beneath the grate.

The fire-chamber A is hollow, containing an annular air-space, $a$, which surrounds the fire-wall $b$, and which, as Fig. 3 clearly represents, contains an inner transverse partition, $d$. The pipe $e$, which connects with the bellows or air-supplying device, leads into one end of this air-chamber $a$ near one side of the partition $d$, while the other end of said air-chamber, near the other side of said partition, connects by a pipe, $f$, with the pit C. Air blown through the pipe $e$ will have to pass through the entire chamber $a$ before it can escape by the pipe $f$ into the pit C, whence it goes to the fire. During this passage the air is thoroughly heated before it gets to the fire, thereby causing a considerable saving in fuel. The air at the same time keeps the fire-wall $b$ comparatively cool, thereby protecting the apparatus against rapid deterioration.

It is not absolutely necessary, although desirable, to pass all the air by the pipe $e$ into the chamber $a$. Some of the air may from the bellows or other air-supplying device go directly by an aperture, $g$, into the pit C.

What I claim is—

In a blacksmith's furnace, the fire-chamber A, surrounded by the air-space $a$, having transverse partition $d$, in combination with the air-supply pipe $e$, and with the air-discharge pipe $f$, on opposite sides of said partition, the last-mentioned pipe leading from the air-passage $a$ to the pit C, beneath the fire, as specified.

HUBBARD D. KING.

Witnesses:
CHARLES G. M. THOMAS,
HARRY M. TURK.